United States Patent
Kim et al.

(10) Patent No.: US 9,794,937 B2
(45) Date of Patent: Oct. 17, 2017

(54) D2D COMMUNICATION METHOD AND DEVICE ON BASIS OF HOPPING SEQUENCE

(71) Applicant: LG ELECTRONICS INC., Seoul (KR)

(72) Inventors: Suhwook Kim, Seoul (KR); Jinyoung Chun, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/034,632

(22) PCT Filed: Oct. 21, 2014

(86) PCT No.: PCT/KR2014/009889
§ 371 (c)(1),
(2) Date: May 5, 2016

(87) PCT Pub. No.: WO2015/068966
PCT Pub. Date: May 14, 2015

(65) Prior Publication Data
US 2016/0278080 A1    Sep. 22, 2016

Related U.S. Application Data

(60) Provisional application No. 61/900,413, filed on Nov. 6, 2013.

(51) Int. Cl.
| | |
|---|---|
| H04W 72/04 | (2009.01) |
| H04B 1/713 | (2011.01) |
| H04W 74/08 | (2009.01) |
| H04W 76/02 | (2009.01) |
| H04B 1/69 | (2011.01) |

(52) U.S. Cl.
CPC ........ *H04W 72/0446* (2013.01); *H04B 1/713* (2013.01); *H04W 74/0816* (2013.01); *H04W 76/023* (2013.01); *H04B 2001/6908* (2013.01)

(58) Field of Classification Search
CPC . H04B 1/00; H04B 1/69; H04B 1/713; H04B 2001/6908; H04Q 7/00; H04Q 7/20; H04W 4/00; H04W 36/00; H04W 48/08; H04W 56/00; H04W 60/00; H04W 72/04;
(Continued)

(56) References Cited

U.S. PATENT DOCUMENTS

| | | | |
|---|---|---|---|
| 2006/0165035 A1* | 7/2006 | Chandra | H04W 28/16 370/329 |
| 2008/0165831 A1* | 7/2008 | Chu | H04B 1/7143 375/132 |

(Continued)

OTHER PUBLICATIONS

Huawei et al., "System-level performance of D2D discovery", R1-134074, 3GPP TSG RAN WGI Metting #74bis, Guangzhou, China, 2013, pp. 1-9.

*Primary Examiner* — Shawkat M Ali
(74) *Attorney, Agent, or Firm* — Birch, Stewart, Kolasch & Birch, LLP

(57) ABSTRACT

Disclosed are a D2D communication method and device on the basis of a hopping sequence. A D2D communication method on the basis of a hopping sequence may comprise the steps of: obtaining information on a reference hopping sequence by a terminal wherein the reference hopping sequence is a current hopping sequence of a target terminal which will perform first D2D communication on the basis of a first link with the terminal; determining a final hopping sequence for performing the first D2D communication by the terminal on the basis of whether the terminal is an initial access terminal or a multi-access terminal and whether the current hopping sequence of the terminal is the same as at least one of communicable hopping sequences corresponding to a reference sequence and the reference hopping sequence; and performing the first D2D communication by the terminal on the basis of the final hopping sequence.

10 Claims, 10 Drawing Sheets

(58) Field of Classification Search
CPC ......... H04W 72/0406; H04W 72/0446; H04W 74/08; H04W 74/0816; H04W 76/02; H04W 76/023; H04W 76/04; H04W 84/00
USPC ........ 370/252, 254, 315, 329; 375/132, 134, 375/138; 455/422.1, 434, 435.1, 437, 455/450, 452.1
See application file for complete search history.

(56) References Cited

U.S. PATENT DOCUMENTS

| | | | |
|---|---|---|---|
| 2009/0011770 A1* | 1/2009 | Jung | H04L 5/0037 455/452.1 |
| 2010/0110929 A1 | 5/2010 | Li et al. | |
| 2011/0098043 A1* | 4/2011 | Yu | H04W 60/00 455/435.1 |
| 2012/0290650 A1 | 11/2012 | Montuno et al. | |
| 2012/0294344 A1 | 11/2012 | Turtinen et al. | |
| 2013/0059583 A1* | 3/2013 | Van Phan | H04W 72/04 455/435.1 |
| 2013/0150051 A1* | 6/2013 | Van Phan | H04W 12/04 455/437 |
| 2013/0286882 A1 | 10/2013 | Lim et al. | |
| 2014/0004867 A1* | 1/2014 | Noh | H04W 76/023 455/450 |
| 2014/0036793 A1* | 2/2014 | Johnsson | H04W 24/04 370/329 |
| 2014/0044036 A1* | 2/2014 | Kim | H04W 72/0446 370/315 |
| 2014/0099950 A1* | 4/2014 | Mildh | H04W 56/001 455/434 |

* cited by examiner

D2D COMMUNICATION METHOD AND DEVICE ON BASIS OF HOPPING SEQUENCE

CROSS REFERENCE TO RELATED APPLICATIONS

This application is the National Phase of PCT International Application No. PCT/KR2014/009889, filed on Oct. 21, 2014, which claims priority under 35 U.S.C. 119(e) to U.S. Provisional Application No. 61/900,413, filed on Nov. 6, 2013, all of which are hereby expressly incorporated by reference into the present application.

BACKGROUND OF THE INVENTION

Field of the Invention

The present invention relates to wireless communications, and more particularly to a device-to-device (D2D) communication method and apparatus based on channel hopping.

Related Art

In most traditional communication environments, users access a server through user devices to download or upload desired content. Such a server-based communication environment is referred to as an infrastructure communication environment. In the infrastructure communication environment, users generally access a server through a base station (BS) of cellular communication or an access point (AP) of a wireless local area network (WLAN).

Recently, device-to-device (D2D) communication receives growing attention. A large number of smartphone applications support D2D communication-based services. D2D communication supports direct communication between user devices. So far, D2D communication has been supported mostly in an application layer. When D2D communication is supported only in the application layer, a server still serves as a relay to connect user devices and user devices may operate in a physical (PHY) layer and a medium access control (MAC) layer in the same way as in the infrastructure communication environment.

When D2D communication is supported also in a PHY layer and MAC layer of a user device, data transmission and/or reception may be performed directly between user devices via no server in D2D communication, unlike in the infrastructure communication environment. That is, data for D2D communication may be transmitted directly between user devices via no server, thereby efficiently using communication resources.

When D2D communication is supported also in a PHY layer and MAC layer of a user device, a transmission delay is reduced and transmission is performed within a relatively close range, and thus transmission power may be also saved. In addition, since no connection is necessary between a user device and a server, a user may transmit massive data to another user device without charge.

In the D2D communication environment, communication between user devices is performed via no BS or AP, and thus it is necessary to design a PHY layer and MAC layer for D2D communication in view of resource allocation, interference avoidance, and synchronization.

SUMMARY OF THE INVENTION

The present invention provides a device-to-device (D2D) communication method based on a hopping sequence.

The present invention also provides a D2D communication device based on a hopping sequence.

In order to achieve the aforementioned purpose of the present invention, according to one aspect of the present invention, a method for D2D communication based on a hopping sequence may include: obtaining information on a reference hopping sequence by a device wherein the reference hopping sequence is a current hopping sequence of a target device which will perform first D2D communication on the basis of a first link with the device; determining a final hopping sequence for performing the first D2D communication by the device on the basis of whether the device is an initial access device or a multi-access device and whether the current hopping sequence of the device is the same as at least one of communication possible hopping sequences corresponding to a reference sequence and the reference hopping sequence; and performing the first D2D communication by the device on the basis of the final hopping sequence. If the device does not perform second D2D communication on the basis of a second link with a different device before the first D2D communication, the device may be the initial access device. If the device has performed the second D2D communication on the basis of the second link with the different device before the first D2D communication, the device may be the multi-access device. The communication possible hopping sequence may include a selectable hopping sequence for performing D2D communication through the same channel on at least one slot which is the same as the reference sequence.

In order to achieve the aforementioned purpose of the present invention, according to another aspect of the present invention, a device for performing D2D communication on the basis of a hopping sequence may include: a radio frequency (RF) unit configured to transmit or receive a radio signal; and a processor operatively coupled to the RF unit. The processor may be configured to: obtain information on a reference hopping sequence by a device wherein the reference hopping sequence is a current hopping sequence of a target device which will perform first D2D communication on the basis of a first link with the device; determine a final hopping sequence for performing the first D2D communication on the basis of whether the device is an initial access device or a multi-access device and whether the current hopping sequence of the device is the same as at least one of communication possible hopping sequences corresponding to a reference sequence and the reference hopping sequence; and perform the first D2D communication on the basis of the final hopping sequence. If the device does not perform second D2D communication on the basis of a second link with a different device before the first D2D communication, the device may be the initial access device. If the device has performed the second D2D communication on the basis of the second link with the different device before the first D2D communication, the device may be the multi-access device. The communication possible hopping sequence may include a selectable hopping sequence for performing D2D communication through the same channel on at least one slot which is the same as the reference sequence.

A device can determine a hopping sequence on the basis of a hopping sequence of a target device for device-to-device (D2D) communication. The device can effectively utilize a D2D communication resource by determining a hopping sequence for D2D communication on the basis of a table including a predetermined hopping sequence, thereby being able to perform D2D communication based on a plurality of links.

DESCRIPTION OF EXEMPLARY EMBODIMENTS

A device-to-device (D2D) communication environment, unlike an infrastructure communication environment, may have characteristics as follows.

A D2D device (hereinafter, referred to as a device) may have high mobility. While a base station (BS) or access point (AP) is stationary in the infrastructure communication environment, both a transmission device and a reception device have mobility in D2D communication, thus leading to relatively greater mobility.

A device may have multiple sessions. Conventionally, a device receives all content through a BS/AP. In D2D communication, however, one device may simultaneously maintain a plurality of sessions (or links) with a plurality of different devices. For example, one device may chat with another device, transmitting/receiving different pieces of data to/from a third device, through a plurality of sessions.

Devices may have different synchronizations. Conventionally, network synchronization between a plurality of devices is performed based on a BS/AP. In D2D communication where communications are performed without a BS or AP, however, synchronization based on a BS and AP is impossible.

In the present invention, it is assumed that D2D communication is performed based on an IEEE 802.11 carrier sense multiple access (CSMA)-collision avoid (CA) system. It is a crucial issue for a device to determine which channel is allocated to each session when maintaining multiple sessions with a plurality of other devices.

Figure 1:
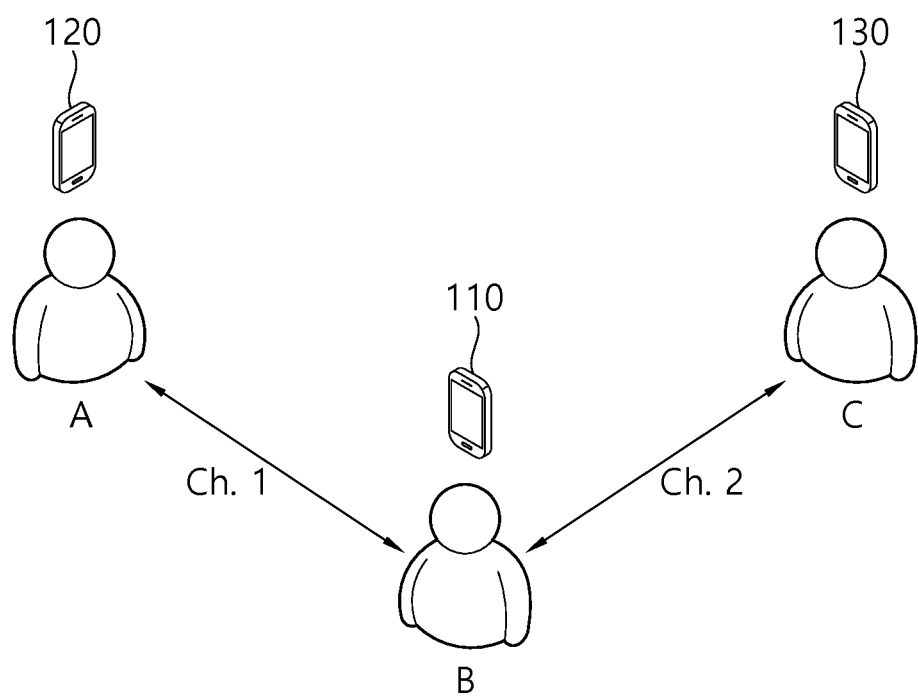
FIG. 1 is a conceptual view illustrating a device-to-device (D2D) communication.

FIG. 1 is a conceptual view illustrating D2D communication.

FIG. 1 illustrates resource allocation in a case where device A 110 performs D2D communications with device B 120 and device C 130 through respective sessions.

It is assumed that device A 110 communicates with device B 120 based on channel 1 and device A 110 communicates with device C 130 based on channel 2.

When D2D communication is performed based on a CSMA-CA system, a device may monitor (or sense) only one channel at a particular time. That is, two channels may not be monitored simultaneously. A time resource for communication between device A 110 and device B 120 through channel 1 is not allowed to overlap a time resource for communication between device A 110 and device C 130 through channel 2.

Device A 110 may communicate with device B 120 and device C 130 by two communication methods. In a first communication method, communications may be performed by setting the same channel for two sessions. For example, when an operation channel for device C 130 is changed to channel 1 based on a request from device A 110, device A 110 may communicate with device B 120 and device C 130 by monitoring channel 1 only. This method may be effective for an environment including a small number of devices. According to this method, however, when there are a growing number of devices, all devices operate in one channel. Thus, communication performance considerably deteriorates and channel resources may be used inefficiently.

In a second communication method, device A 110 may communicate with device B 120 and device C 130 by autonomously hopping between channel 1 and channel 2. As described above, when device A 110 communicates with device B 120 in channel 1, device A 110 may not communicate with device C 130 in channel 2. Likewise, when device A 110 communicates with device C 130 in channel 2, device A 110 may not communicate with device B 120 in channel 1. Similarly, when device B 120 and device C 130 do not communicate with device A 110, device B 120 and device C 130 may communicate with other devices through other sessions. In the second communication method, when a device has no information on channel hopping (or channel allocation) for another device to communicate with, the devices may not communicate with each other at a particular time through a particular channel. Further, if there are no defined rules and specifications for operations by switching a channel, communication performance may deteriorate.

Figure 2:
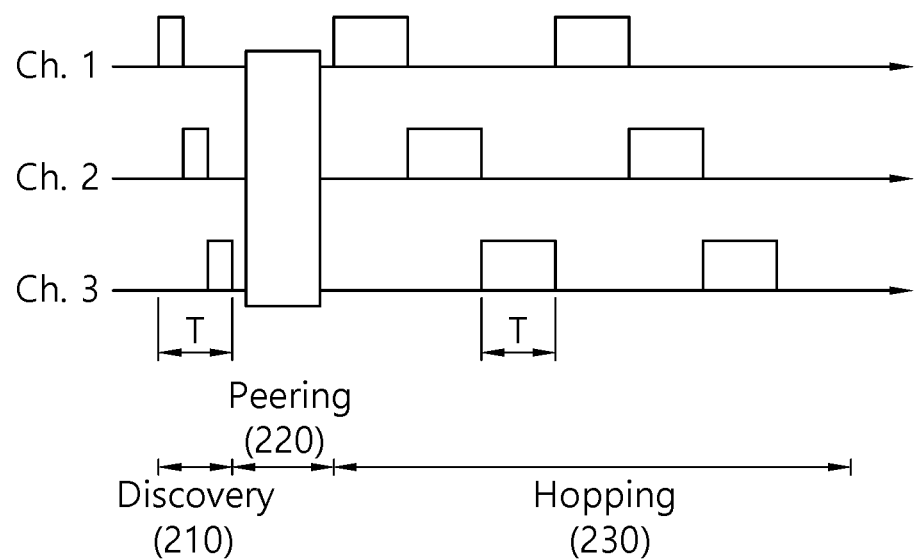
FIG. 2 is a conceptual view illustrating channel hopping in D2D communication.

FIG. 2 is a conceptual view illustrating channel hopping in D2D communication.

FIG. 2 illustrates a basic procedure for D2D communication from a device point of view. Three phases may be performed for D2D communication. The three phases for D2D communication may include a discovery phase 210, a peering phase 220, and a hopping phase 230.

In the discovery phase 210, a device may search for another device, hopping between all or part of channels for D2D communication. In the discovery phase 210, a device conducting a search may transmit a discovery request frame, hopping between channels to search for another device. The other device receiving the discovery request frame may transmit a discovery response frame to the device. The device may perform the peering phase 220 on a target device to form a session (or link) for D2D communication with among devices discovered in the discovery phase 210.

In the peering phase 220, the device may transmit a peering request frame to the target device. Further, the device may receive a peering response frame from the target device.

When a link with the target device is successfully established in the peering phase 220, the device may communicate between the target device in the hopping phase 230.

In the hopping phase 230, communication about actual traffic data may be performed between the device and the target device. The device may perform D2D communication by repeating the hopping phase 230. Further, as necessary, the device may perform the discovery phase 210 again to search for a neighbor device.

In the discovery phase 210, a time resource for discovery may be fixed to T. In the hopping phase 220, a time resource for data communication may be allocated a length which is integer times T. In the hopping phase 230, a unit of a time resource of T may be denoted by the term "slot." In the hopping phase 230, the device may use m slots as a time resource for communication.

In an embodiment of the present invention illustrated below, it is assumed for convenience that hopping is performed between a plurality of channels based on a hopping pattern (hopping sequence) defined in six slots (that is, m=6) in the hopping phase 230. The plurality of channels may be three channels. A plurality of slots in which the hopping sequence is defined may be denoted by the term "hopping slot set."

Hereinafter, in the embodiment of the present invention, a hopping sequence for channel hopping in the hopping phase 230 may be represented in brackets, such as (x, x, x, x, x, x).

In FIG. 2, the device may communicate with the other device, sequentially moving to channel 1, channel 2, channel 3, channel 1, channel 2, and channel 3 in a hopping slot set including six slots. In this case, a hopping sequence of the device may be (1, 2, 3, 1, 2, 3).

Figure 3:
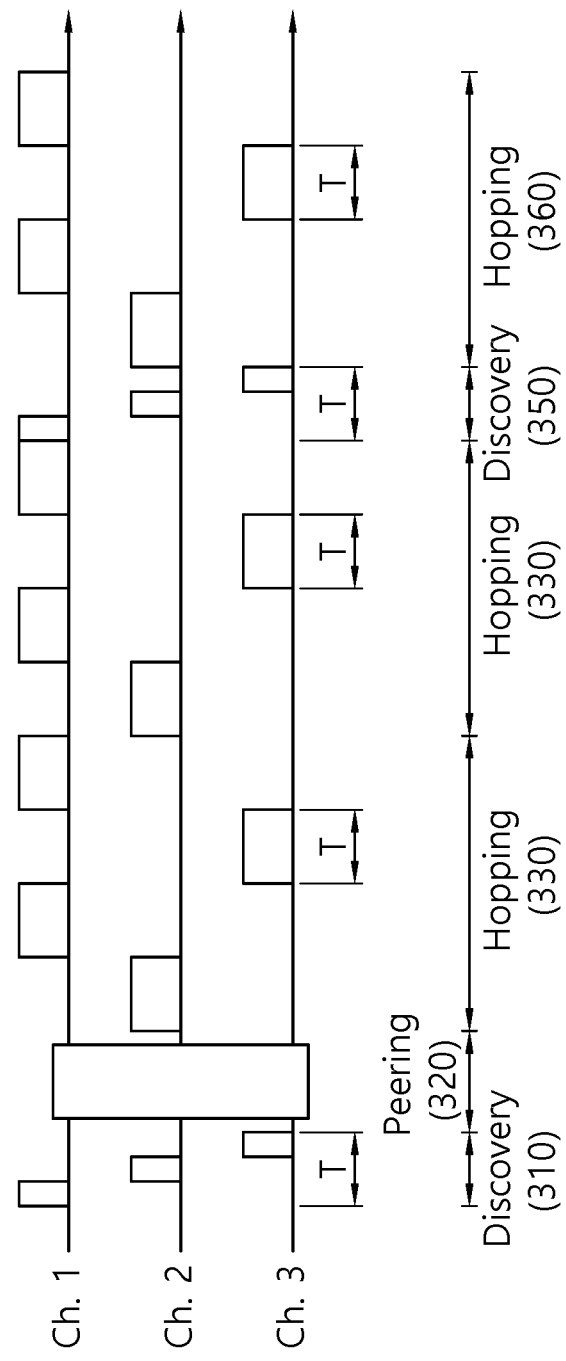
FIG. 3 is a conceptual view illustrating channel hopping in D2D communication.

FIG. 3 is a conceptual view illustrating channel hopping in D2D communication.

FIG. 3 illustrates that a device establishes a link with another device and performs D2D communication by repeating a hopping phase and a discovery phase.

Referring to FIG. 3, a device performs a first discovery phase 310 and a first peering phase 320, and then performs a first hopping phase 330. A hopping sequence may be (2, 1, 3, 1) defined in a hopping slot set including four slots. In the first hopping phase 330, D2D communication may be performed in two hopping slot sets. That is, in the first hopping phase 330, the device may perform channel hopping twice based on a hopping sequence repeated twice in eight slots.

After the first hopping phase 330, the device may perform a second discovery phase 350 and a second hopping phase 360.

Figure 4:
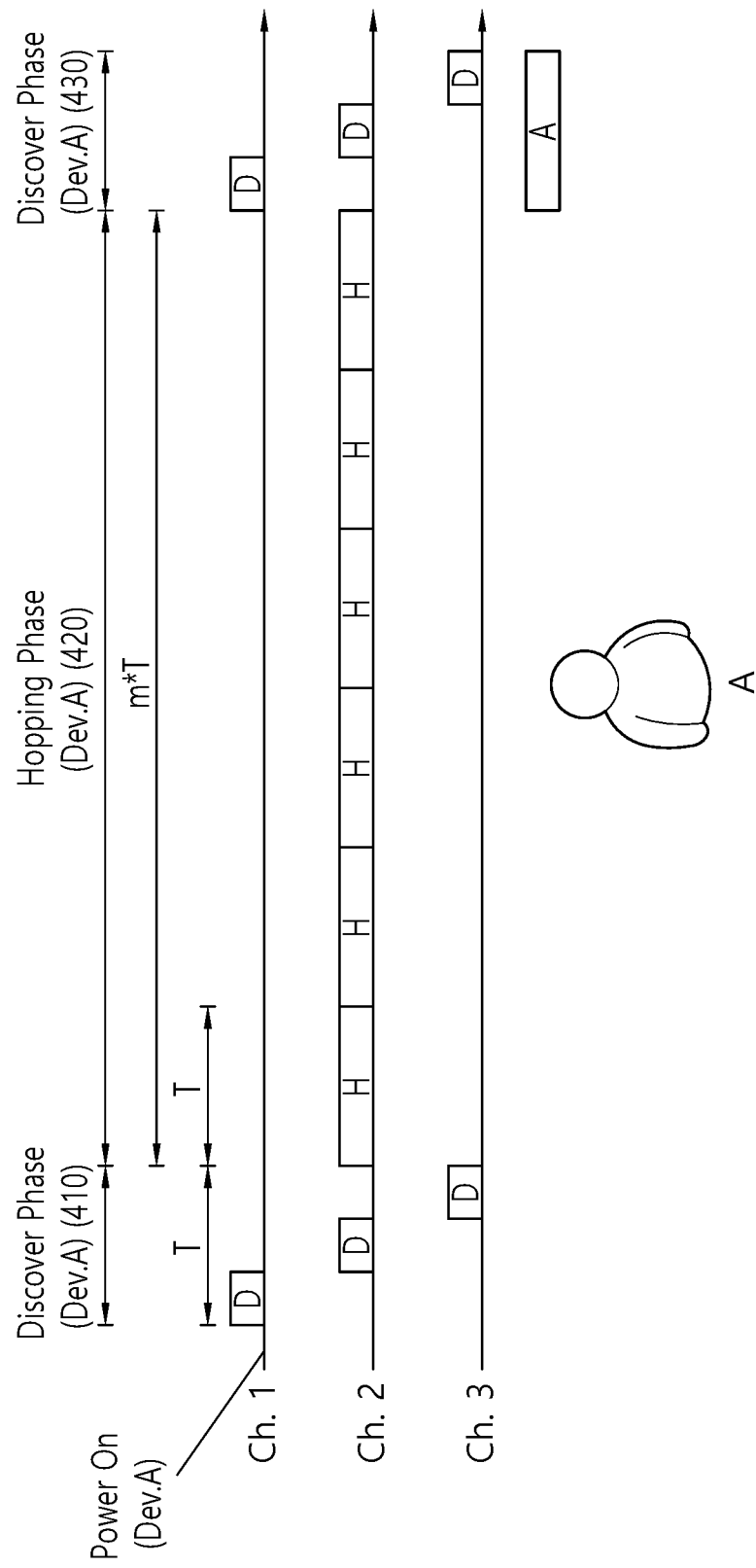
FIG. 4 is a conceptual view illustrating D2D communication.
Figure 5:
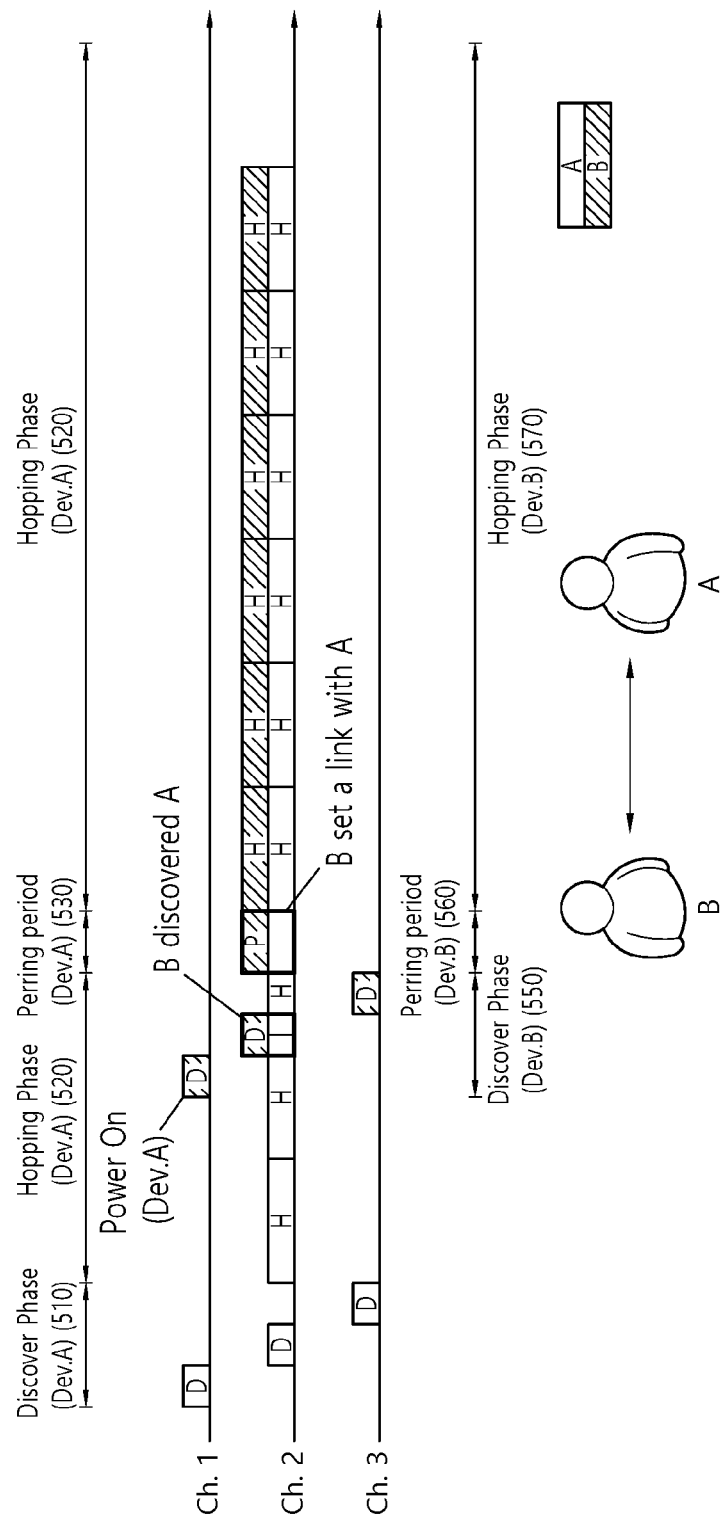
FIG. 5 is a conceptual view illustrating D2D communication.
Figure 6:
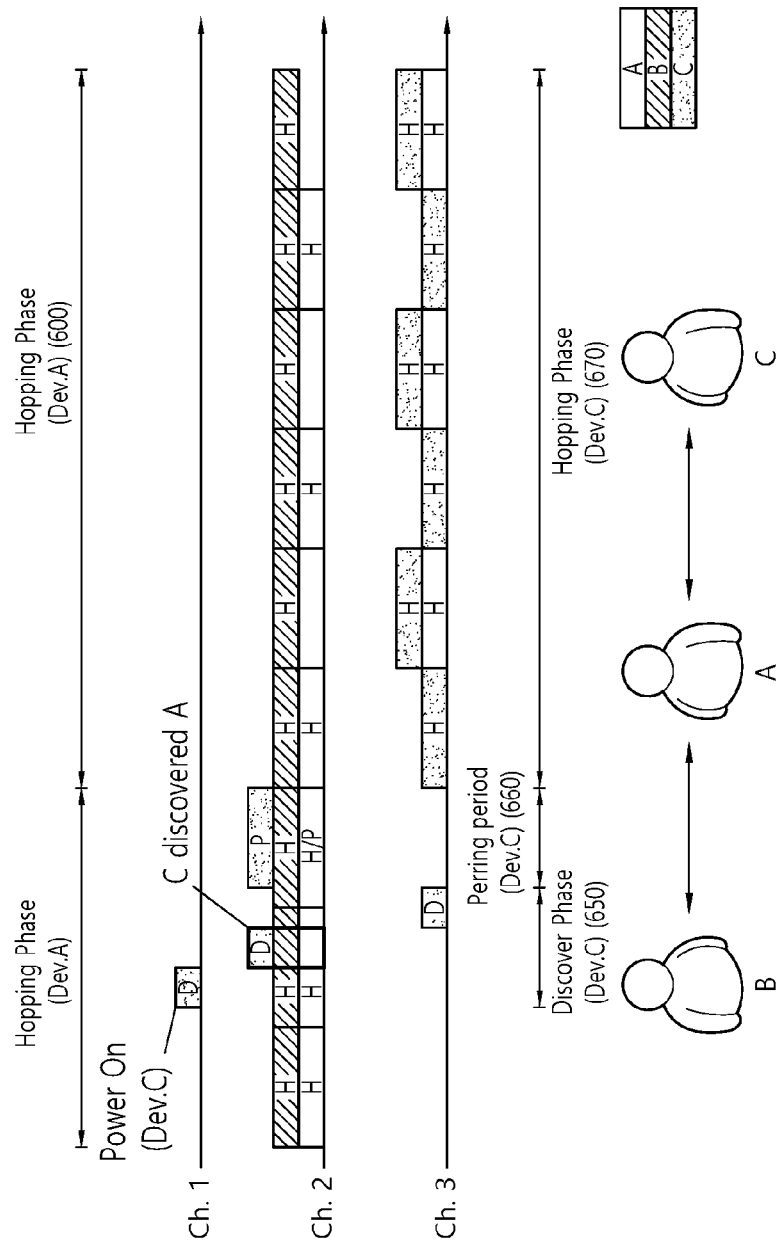
FIG. 6 is a conceptual view illustrating D2D communication.

Hereinafter, FIGS. 4 to 6 illustrate a D2D communication method through a discovery phase, a peering phase, and a hopping phase in detail.

FIG. 4 is a conceptual view illustrating D2D communication.

FIG. 4 illustrates an operation of device A in a case where device A is powered on and discovers no neighbor device. D and H may represent a discovery phase and a hopping phase, respectively.

Referring to FIG. 4, when device A is powered on, device A may search for a neighbor device, sequentially hopping between channels 1, 2, and 3, in a first discovery phase 410. In the first discovery phase 410, device A may discover no neighbor device in channels 1, 2, and 3. In this case, device A may immediately switch to a first hopping phase 420, without forming a link through a peering phase. In a case where device A continues to perform the discovery phase 410, device A needs to transmit a discovery request frame, hopping between channels, thus consuming great power. Thus, device A may switch to the hopping phase 420 to reduce power consumption even when no target device is discovered in the discovery phase 410.

In the first hopping phase 420, no link is established. Thus, device A may operate in one channel in a reception mode or low-power mode, without performing hopping, monitoring a frame of another device transmitted via the channel. When device A operates only in channel 2, a hopping sequence of the device is (2, 2, 2, 2, 2, 2). In the hopping phase 420, an operation channel for device A may be selected randomly or a channel having minimum interference may be selected.

After the first hopping phase in a hopping slot set in which a hopping sequence is defined, a second discovery phase 430 may be performed. Device A may re-search for a neighbor device in the second discovery phase 430.

FIG. 5 is a conceptual view illustrating D2D communication.

FIG. 5 illustrates a D2D communication operation after device B is powered on in the situation in FIG. 4. Device A may be a target device of device B. D refers to a discovery phase, H to a hopping phase, and P to a peering phase.

Device B may perform a discovery phase 550 in channels 1, 2, and 3. Device B may discover device A performing a hopping phase 520 in channel 2.

When device A is a target device of device B, device B may hop to channel 2 after the discovery phase 550 and form a link with device B through a peering phase 560.

Subsequently, device A and device B may transmit or receive traffic data in hopping phases 520 and 570. In peering phases 530 and 560 or the discovery phase 550, device A and device B may acquire information on links between counterpart devices and another device and/or information on hopping sequences of the counterpart devices.

For example, when both device A and device B have no link with another device, a link may be established between device A and device B and then communication between device A and device B may be performed in one channel (for example, channel 2). After the link is established, device A and device B may communicate by setting an operation channel to one channel 2, without hopping between channels in the hopping phases 520 and 570. Alternatively, device A and device B may perform channel hopping, in which a hopping sequence of device A and a hopping sequence of device B may be the same. Alternatively, when significant interference occurs in channel 2 used for communication, device A and device B may define a new hopping sequence to communicate based on the newly defined hopping sequence.

FIG. 6 is a conceptual view illustrating D2D communication.

FIG. 6 illustrates an operation after device C is powered on in the situation in FIG. 5. Device A may be a target device of device C.

Referring to FIG. 6, device C may search for device A in channel 2 in a discovery phase 650 through channels 1, 2, and 3.

Device C may recognize that device A and device B form a link to communicate through the discovery phase 650 and/or peering phase 660.

In this case, device A may determine a new hopping sequence to communicate with device B and device C. For example, device A may change a hopping sequence from (2, 2, 2, 2, 2, 2) to (2, 3, 2, 3, 2, 3) to operate in a hopping phase 600. That is, device A may change an operation channel on slot 2, slot 4, and slot 6 among a plurality of slots included in a hopping slot set to channel 3 for communication with device C. Device A does not change an operation channel on slot 1, slot 3, and slot 5 among the plurality of slots included in the hopping slot set, thus reducing overheads in a hopping sequence change.

The operation channel on slot 2, slot 4, and slot 6 may be selected randomly by device A or by device C. For example, device C may transmit information on a recommended channel and information on a hopping sequence for D2D communication to device A in the discovery phase 650 and/or peering phase 660. Device A may determine a hopping sequence in view of the information on the recommended channel transmitted from device C.

Device A and device C may operate by setting the same operation channel on slot 2, slot 4, and slot 6 or setting different operation channels on slot 2, slot 4, and slot 6. When an optimal channel is selected in each slot, data transmission efficiency may be enhanced, whereas overheads caused by channel hopping may occur. On the contrary, when the same channel is selected in each slot, overheads caused by channel hopping do not occur, while data transmission efficiency may be decreased.

In FIG. 6, device C may communicate with device A in slots 2, 4, and 6, operating in a hopping sequence of (3, 3, 3, 3, 3, 3) in the hopping phase 670. Device C may save slots 1, 3, and 5 for subsequent communication based on a link with another device. Device C currently has no link with another device except for device A. Thus, device C may operate by setting channel 3 as an operation channel on slots 1, 3, and 5 without channel hopping.

A hopping sequence for communication between device A and device C may be determined on the basis of various methods.

Hereinafter, a method in which a device determines a hopping sequence for D2D communication, and performs D2D communication on the basis of the determined hopping sequence is disclosed according to an embodiment of the present invention. Hereinafter, in FIG. 7 to FIG. 9, the discovery phase and the peering phase are omitted for convenience of explanation.

Figure 7:
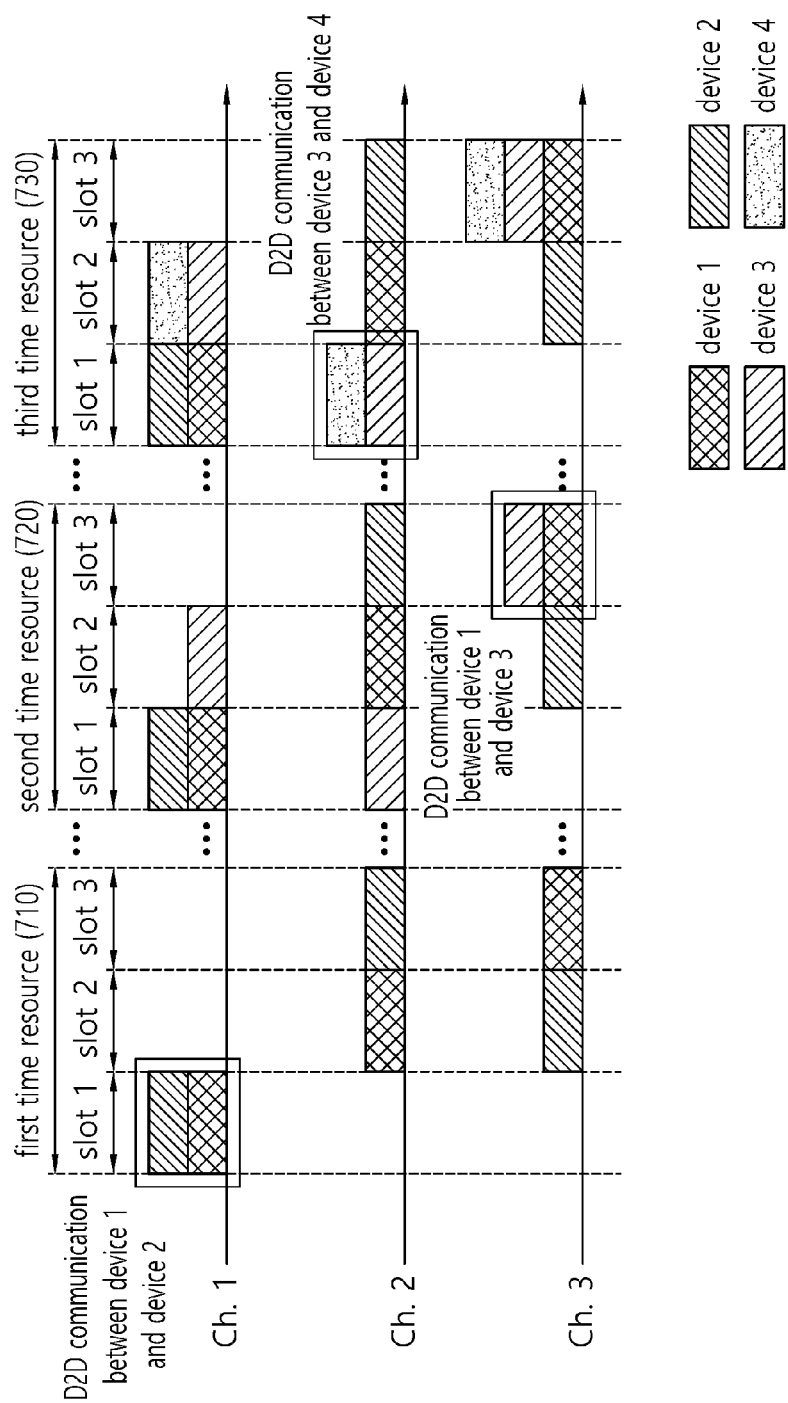
FIG. 7 is a conceptual view illustrating a hopping method according to an embodiment of the present invention.

FIG. 7 is a conceptual view illustrating a hopping method according to an embodiment of the present invention.

In a method disclosed in FIG. 7, a device selects a communication possible sequence corresponding to a hopping sequence of a target device as the hopping sequence to perform D2D communication with a target device. The target device may be a device with which the device intends to perform D2D communication.

Hereinafter, a hopping slot set including 3 slots and a hopping sequence defined on 3 channels and a communication possible hopping sequence corresponding to the hopping sequence are disclosed for convenience of explanation according to the embodiment of the present invention. However, D2D communication may be performed according to an embodiment of the present invention to be described below on the basis of a hopping slot set including a plurality of slots and a hopping sequence defined on a plurality of channels and a communication possible hopping sequence corresponding to the hopping sequence.

Table 1 below shows a plurality of hopping sequences that can be used for D2D communication.

TABLE 1

| Sequence ID | Hopping Sequence |
|---|---|
| 1 | (1, 2, 3) |
| 2 | (1, 3, 2) |
| 3 | (2, 1, 3) |
| 4 | (2, 3, 1) |
| 5 | (3, 1, 2) |
| 6 | (3, 2, 1) |

Table 2 below shows a sequence ID of a communication possible hopping sequence corresponding to each sequence ID of a reference sequence.

TABLE 2

| Sequence ID | Hopping Sequence | Communication possible sequence (CP-Sequence) |
|---|---|---|
| 1 | (1, 2, 3) | 2 (Ch. 1, Slot 1) |
| | | 3 (Ch. 3, Slot 3) |
| | | 6 (Ch. 2, Slot 2) |
| 2 | (1, 3, 2) | 1 (Ch. 1, Slot 1) |
| | | 4 (Ch. 3, Slot 2) |
| | | 5 (Ch. 2, Slot 3) |
| 3 | (2, 1, 3) | 1 (Ch. 3, Slot 3) |
| | | 4 (Ch. 2, Slot 1) |
| | | 5 (Ch. 1, Slot 2) |
| 4 | (2, 3, 1) | 2 (Ch. 3, Slot 2) |
| | | 3 (Ch. 1, Slot 1) |
| | | 6 (Ch. 2, Slot 3) |
| 5 | (3, 1, 2) | 2 (Ch. 2, Slot 3) |
| | | 3 (Ch. 1, Slot 2) |
| | | 6 (Ch. 3, Slot 1) |
| 6 | (3, 2, 1) | 1 (Ch. 2, Slot 2) |
| | | 4 (Ch. 1, Slot 3) |
| | | 5 (Ch. 3, Slot 1) |

Referring to Table 1, if 3 slots and 3 channels are present, the number of hopping sequences that can be selected by the device is 6 as shown in Table 1. Sequence IDs may correspond to the respective hopping sequences. The hopping sequence may be defined on a hopping slot set including 3 slots, and an element indicating a channel included in the shopping sequence may corresponds to each of a plurality of slots included in the slot set.

Referring to Table 2, the reference hopping sequence is a hopping sequence used as a reference for determining a hopping sequence of a different device, and the communication possible hopping sequence may be a hopping sequence determined on the basis of the reference sequence.

The sequence ID of the reference hopping sequence may indicate a hopping sequence corresponding to the sequence ID disclosed in Table 1. Hereinafter, a reference hopping sequence N may indicate a hopping sequence corresponding to a sequence ID N.

Further, the sequence ID of the communication possible hopping sequence may also indicate the hopping sequence corresponding to the sequence ID disclosed in Table 1. Hereinafter, a communication possible hopping sequence N may be a hopping sequence corresponding to the sequence ID N.

Specifically, for example, referring to a first time resource 710 of FIG. 7, a device 1 operating based on a reference hopping sequence 1 (1, 2, 3) may perform channel hopping through a channel 1, a channel 2, and a channel 3 in each slot. That is, in a hopping phase, the device 1 may perform D2D communication through the channel 1 on a slot 1, the channel 2 on a slot 2, and the channel 3 on a slot 3. The reference hopping sequence 1 may corresponds to communication possible hopping sequences 2, 3, and 6. A device which intends to perform D2D communication with the device 1 may operate on the basis of one communication possible hopping sequence among the communication possible hopping sequences 2, 3, and 6.

For example, a device 2 may perform D2D communication with the device 1 on the basis of the communication possible hopping sequence 2 (1, 3, 2). The device 2 which performs channel hopping on the basis of the communication possible hopping sequence 2 may perform channel hopping through the channel 1, the channel 3, and the channel 2 in each slot. That is, in the hopping phase, the device 2 may perform D2D communication through the channel 1 on the slot 1, the channel 3 on the slot 2, and the channel 2 on the slot 3.

If the device 1 and the device 2 perform D2D communication by being time synchronized in the hopping phase, the device 1 and the device 2 may perform D2D communication through the channel 1 on the slot 1.

Referring to a second time resource 720 of FIG. 7, for another example, if a device 3 intends to additionally perform D2D communication with the device 1, the device 3 may operate on the basis of the communication possible hopping sequence 3 (2, 1, 3). If the device 3 operates on the basis of the communication possible hopping sequence 3 (2, 1, 3), the device 3 may perform D2D communication through the channel 2 on the slot 2, the channel 1 on the slot 2, and the channel 2 on the slot 3.

If the device 3 performs D2D communication by being time synchronized with the device 1 on the basis of the communication possible hopping sequence 3, the device 1 and the device 3 may perform communication through the channel 3 on the slot 3.

Referring to a third time resource 730 of FIG. 7, if a device 4 intends to additionally perform communication with the device 3, a hopping sequence of the device 3 corresponding to the communication possible hopping sequence 3 may be the reference hopping sequence. That is, from a perspective of the device 4, the device 3 may be a device which operates on the basis of a reference hopping sequence 3. The device 4 may operate on the basis of one communication possible hopping sequence among communication possible hopping sequences 1, 4, and 5 corresponding to the reference hopping sequence 3.

If the device 4 performs D2D communication by being time synchronized with the device 3 on the basis of the communication possible hopping sequence 4, the device 3 and the device 4 may perform D2D communication through the channel 2 on the slot 1.

That is, D2D communication according to an embodiment of the present invention may be performed on the basis of a reference hopping sequence and a communication possible hopping sequence corresponding to the reference hopping sequence.

Figure 8:
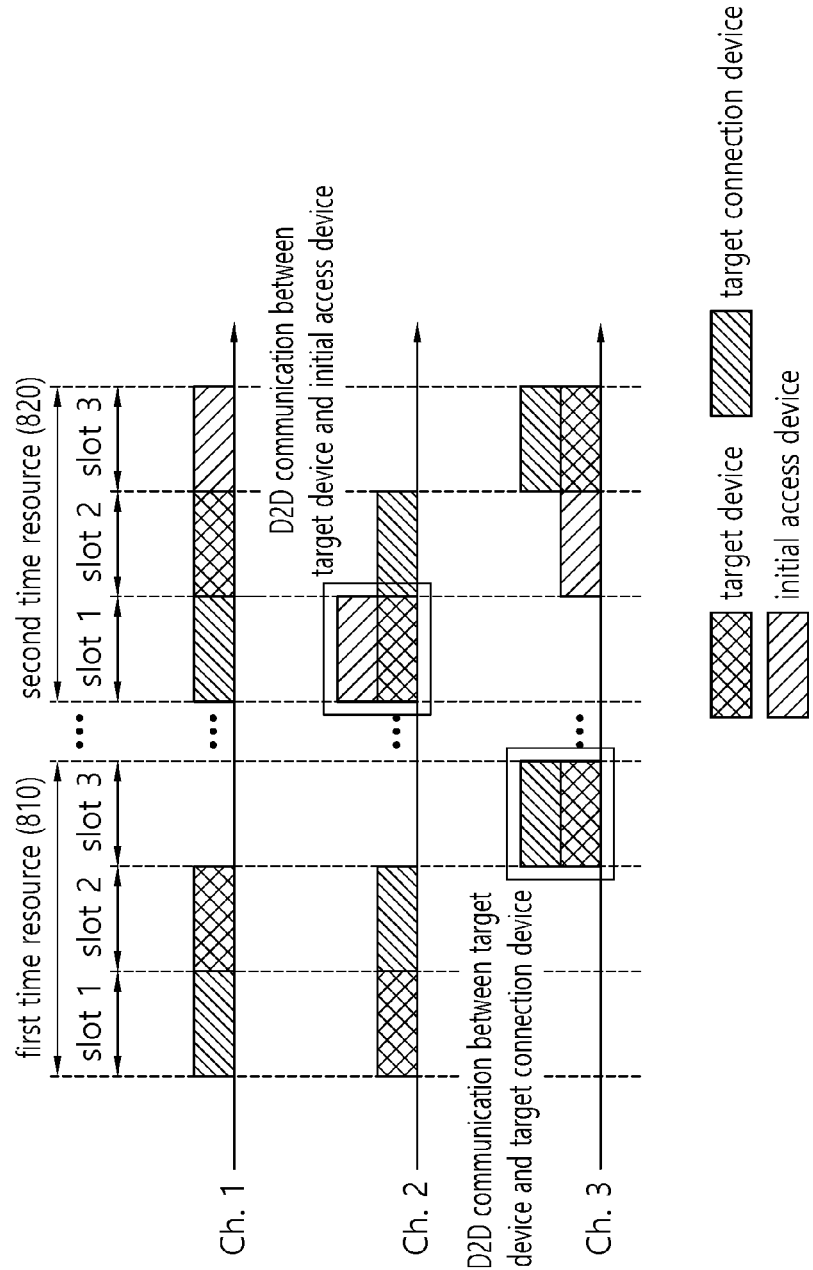
FIG. 8 is a conceptual view illustrating a method of determining a hopping sequence of a device according to an embodiment of the present invention.

FIG. 8 is a conceptual view illustrating a method of determining a hopping sequence of a device according to an embodiment of the present invention.

In FIG. 8, a method of determining a hopping sequence of a device is disclosed when there is no link connected to a different device for D2D communication (that is, when the device performs initial access for D2D communication). Hereinafter, the device which performs initial access for D2D communication may be expressed by a term 'initial access device'.

When the initial access device intends to perform initial access for D2D communication with a target device in a state of not having a previously connected link, the initial access device may acquire information regarding a hopping sequence of the target device to be connected and a hopping sequence used by target connection devices which are devices connected with the target device. The target connection device may imply a different device which performs D2D communication by establishing a link with respect to the target device. A reference hopping sequence of the initial access device may be a hopping sequence of the target device.

The initial access device may select one of communication possible hopping sequences not used by the target connection device as a final hopping sequence among communication possible sequences corresponding to the reference hopping sequence used by the target device. The communication possible hopping sequence not used by the target connection device may be expressed by a term 'candidate communication possible hopping sequence'. If the candidate communication possible hopping sequence is plural in number, the initial access device may randomly determine one candidate communication possible hopping sequence as the final hopping sequence among a plurality of candidate communication possible hopping sequences. Alternatively, the initial access device may consider a state of a communication channel to determine one candidate communication possible hopping sequence of which a state of a communication channel is good as the final hopping sequence among a plurality of communication possible hopping sequences.

If the candidate communication possible hopping sequence is only one in number, the initial access device may determine one candidate communication possible hopping sequence as the final hopping sequence, and may perform D2D communication on the basis of the final hopping sequence.

Alternatively, the initial access device may select the reference hopping sequence used by the target device as the final hopping sequence. In this case, the initial access device and the target device may perform D2D communication on the basis of the same hopping sequence.

If the D2D communication is performed on the basis of the reference hopping sequence and the communication possible sequence as shown in Table 1 and Table 2, the initial access device may determine the final hopping sequence as follows.

Referring to a first time resource 810 of FIG. 8, it may be assumed that a target device uses a reference hopping sequence 3 (2, 1, 3), and a target connection device uses a communication possible hopping sequence 1 (1, 2, 3). The target device and the target connection device may perform D2D communication through a channel 3 on a slot 3. A plurality of communication possible hopping sequences corresponding to the reference hopping sequence 3 may be communication possible hopping sequences 1, 4, and 5. Among the plurality of communication possible hopping sequences, the communication possible hopping sequences 4 and 5 other than the communication possible hopping sequence 1 used by the target connection device may be the candidate communication possible sequence. Therefore, in this case, the final hopping sequence of the initial access device may be determined as one of the communication possible hopping sequences 4 and 5. A second time resource 820 of FIG. 8 shows a case where the final hopping sequence of the initial access device is the communication possible hopping sequence 4 (2, 3, 1). The target device and the initial access device may perform D2D communication through a channel 2 on a slot 1.

For another example, it may be assumed that the target device uses a reference hopping sequence 1, and the target connection device uses all of communication possible hopping sequences 2, 3, and 6. In this case, the initial access device may randomly determine one of the communication possible hopping sequences 2, 3, and 6 as the final hopping sequence. Alternatively, the initial access device may determine one of the communication possible hopping sequences 2, 3, and 6 as the final hopping sequence by considering a channel state.

Figure 9:
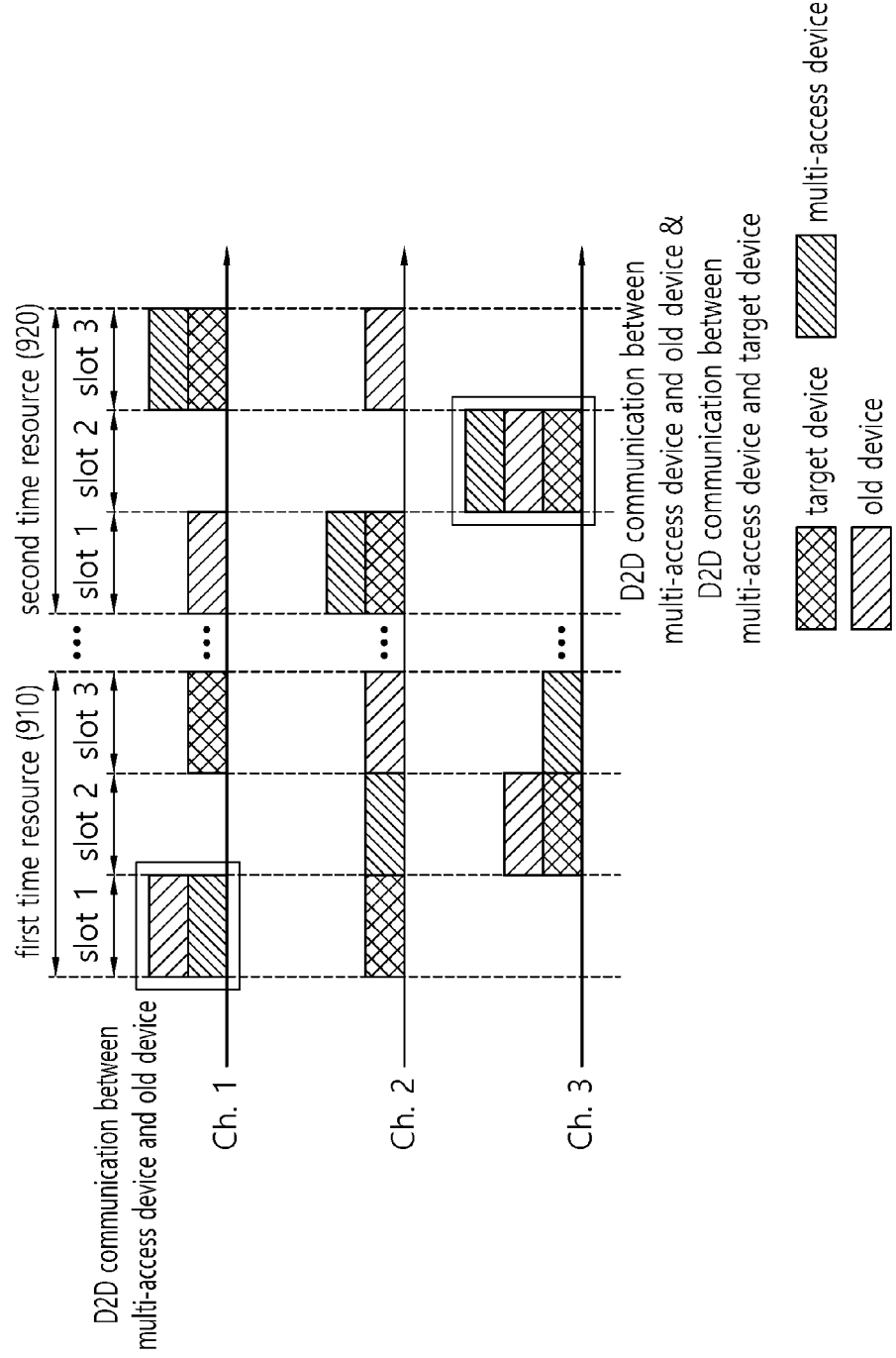
FIG. 9 is a conceptual view illustrating a method of determining a hopping sequence of a device according to an embodiment of the present invention.

FIG. 9 is a conceptual view illustrating a method of determining a hopping sequence of a device according to an embodiment of the present invention.

In FIG. 9, a method of determining a hopping sequence of a device is disclosed when an old link is already established to the device for D2D communication (that is, device has already performed D2D communication with an old device on the basis of a specific hopping sequence) and when the device newly configures a link for D2D communication with a target device. Hereinafter, as a device which is currently performing communication with the old device on the basis of the specific hopping sequence, a device which intends to perform D2D communication on the basis of the new link with respect to the new target device on the basis of the specific hopping sequence may be expressed as a term 'multi-access device'.

The multi-access device may acquire information regarding the reference hopping sequence (the hopping sequence of the target device) and the communication possible sequence corresponding to the reference hopping sequence. The multi-access device may determine whether a current hopping sequence is the same as the reference hopping sequence or one of communication possible sequences corresponding to the reference hopping sequence. For example, the multi-access device may determine whether a sequence ID of the current hopping sequence is the same as one of a sequence ID of the reference hopping sequence and a sequence ID of the communication possible sequence corresponding to the reference hopping sequence.

If the current hopping sequence of the multi-access device is the same as the reference hopping sequence or one of the communication possible sequences corresponding to the reference hopping sequence, the multi-access device may communicate with the target device by using the current hopping sequence. Therefore, the multi-access device may perform D2D communication with the target device in the current hopping sequence without having to additionally change the hopping sequence.

For example, it may be assumed that the multi-access device operates by setting a hopping sequence corresponding to a sequence ID 1 (1, 2, 3) as the current hopping sequence, and the target device operates on the basis of the reference hopping sequence 3. Referring to Table 2, a communication possible hopping sequence corresponding to the reference hopping sequence 3 may be the communication possible hopping sequences 1, 4, and 5. Therefore, since the current hopping sequence of the multi-access device is the same as the communication possible hopping sequence 1, the multi-access device may operate without having to change the current hopping sequence.

On the contrary, if the current hopping sequence of the multi-access device is not the same as the reference hopping sequence or one of the communication possible sequences corresponding to the reference hopping sequence, the multi-access device may determine the final hopping sequence by changing the current hopping sequence. The final hopping sequence of the multi-access device may be determined by considering the reference hopping sequence of the target device.

For example, when D2D communication is performed on the basis of the reference hopping sequence and the communication possible hopping sequence as shown in Table 1, the multi-access device may change the current hopping sequence as a hopping sequence which is the same as the reference hopping sequence (i.e., the hopping sequence of the target device). That is, the final hopping sequence of the multi-access device may be a hopping sequence having the same sequence device as the reference hopping sequence.

The multi-access device changes the current hopping sequence as the final hopping sequence having the same sequence ID as the reference hopping sequence, and thus can perform D2D communication on the basis of a new link with the target device while performing D2D communication with the old device on the basis of the old link.

Referring to Table 2, when the multi-access device changes the current hopping sequence to the final hopping sequence having the same sequence ID as the reference hopping sequence, the changed final sequence may be related as a communication possible hopping sequence of the old device. Therefore, the multi-access device may perform D2D communication by establishing a link with each of the old device and the target device by changing the current hopping sequence to the final hopping sequence having the same sequence ID as the reference hopping sequence.

Specifically, for example, referring to a first time resource 910 of FIG. 9, it may be assumed that a current hopping sequence of a multi-access device is a hopping sequence of a sequence ID 1 (1, 2, 3) and a reference hopping sequence is a hopping sequence of a sequence ID 4 (2, 3, 1) (that is, when the target device operates with a reference hopping sequence 4). In order to perform communication with the multi-access device which operates on the basis of the hopping sequence of the sequence ID 1, the hopping sequence of the old device may be a hopping sequence corresponding to a sequence ID 2, 3, or 6. It is assumed in FIG. 9 that the old device operates on the basis of a hopping sequence corresponding the sequence ID 2 (1, 3, 2).

The current hopping sequence of the multi-access device is not the same as a reference hopping sequence 4 (2, 3, 1) or a communication possible sequence 2 (1, 3, 2), 3 (2, 1, 3), or 6 (3, 2, 1) corresponding to the reference hopping sequence. The multi-access device may not perform D2D communication with both of the old device and the target device by using the current hopping sequence. Therefore, the multi-access device may change the current hoping sequence to a hopping sequence which is the same as the reference hopping sequence. That is, the multi-access device may determine a hopping sequence (2, 3, 1) corresponding to the sequence ID 4 as a final hopping sequence.

Referring to Table 2, if the hopping sequence corresponding to the ID 2, 3, or 6 as the hopping sequence of the old sequence is a reference sequence, a hopping sequence corresponding to the sequence ID 4 may be a communication possible sequence of the reference sequence.

Specifically, if the hopping sequence of the old device is a hopping sequence (1, 3, 2) corresponding to the ID 2, a communication possible sequence which can operate the hopping sequence of the old device as the reference sequence is a communication possible sequence 1, 4, or 5. Therefore, D2D communication may also be performed between the old device and the multi-access device which determines the final sequence as the hopping sequence (2, 3, 1) corresponding to the sequence ID 4.

Therefore, the multi-access device may perform D2D communication not only with the target device but also with the old device.

In addition to the aforementioned example, in case of using Table 2, when the multi-access device changes the current hopping sequence to the final hopping sequence having the same sequence ID as the reference hopping sequence, the changed final sequence may be related as a communication possible hopping sequence of the old device.

Figure 10:
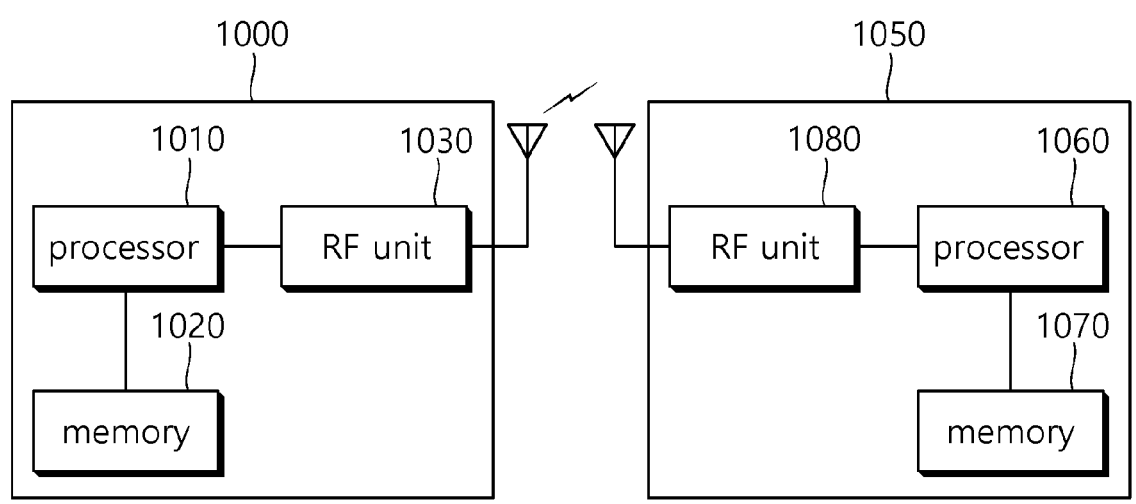
FIG. 10 is a block diagram illustrating a wireless device according to an embodiment of the present invention.

FIG. 10 is a block diagram illustrating a wireless device according to an embodiment of the present invention.

Referring to FIG. 10, a first device 1000 and a second device 1050 may be a wireless device capable of implementing the aforementioned embodiment.

The first device 1000 includes a processor 1010, a memory 1020, and a radio frequency (RF) unit 1030.

The RF unit 1030 may be coupled with the processor 1010 to transmit/receive a radio signal.

The processor 1010 may implement the functions, procedures, and/or methods proposed in the present invention. For example, the processor 1010 may perform an operation of the device according to the embodiment of the present invention described with reference to FIG. 7 to FIG. 9.

For example, the processor 1010 may be configured to acquire information regarding a reference hopping sequence. The reference hopping sequence may be a current hopping sequence of a target device which will perform first D2D communication on the basis of a first link with the device. Further, the processor 1010 may be configured to determine a final hopping sequence for performing the first D2D communication on the basis of whether the device is an initial access device or a multi-access device and whether the current hopping sequence of the device is the same as at least one of communication possible hopping sequences corresponding to a reference sequence and the reference hopping sequence. Furthermore, the processor 1010 may be configured to perform the first D2D communication on the basis of the final hopping sequence.

If the device does not perform second D2D communication on the basis of a second link with a different device before the first D2D communication, the device may be the initial access device, and if the device has performed the second D2D communication on the basis of the second link with the different device before the first D2D communication, the device may be the multi-access device. The communication possible hopping sequence may include a selectable hopping sequence for performing D2D communication through the same channel on at least one slot which is the same as the reference sequence.

The second device 1050 includes a processor 1060, a memory 1070, and an RF unit 1080.

The RF unit 1080 may be coupled with the processor 1060 to transmit/receive a radio signal.

The processor 1060 may implement the functions, procedures, and/or methods proposed in the present invention. For example, the processor 1060 may perform an operation of the device according to the embodiment of the present invention described with reference to FIG. 7 to FIG. 9.

For example, the processor 1060 may be configured to transmit information regarding a reference hopping sequence to a first device if a second device is a target device. Further, the processor 1060 may be configured to perform D2D communication with the first device if the first device operates on the basis of a final reference hopping sequence.

The processors 1010 and 1060 may include an application-specific integrated circuit (ASIC), a separate chipset, a logic circuit, a data processing unit, and/or a converter for mutually converting a baseband signal and a radio signal. The memories 1020 and 1070 may include a read-only memory (ROM), a random access memory (RAM), a flash memory, a memory card, a storage medium, and/or other equivalent storage devices. The RF units 1030 and 1080 may include one or more antennas for transmitting and/or receiving the radio signal.

When the embodiment of the present invention is implemented in software, the aforementioned methods can be implemented with a module (i.e., process, function, etc.) for performing the aforementioned functions. The module may be stored in the memories 1020 and 1070, and may be performed by the processors 1010 and 1060. The memories 1020 and 1070 may be located inside or outside the processors 1010 and 1060, and may be coupled to the processors 1010 and 1060 by using various well-known means.

What is claimed is:

1. A method for device-to-device (D2D) communication based on a hopping sequence, the method comprising:
   obtaining, by a device, information on a reference hopping sequence, wherein the reference hopping sequence is a current hopping sequence of a target device on which a first D2D communication is to be performed based on a first link with the device;
   determining, by the device, a final hopping sequence for performing the first D2D communication based on whether the device is an initial access device or a multi-access device and whether the current hopping sequence of the device is the same as at least one of the reference hopping sequence and a communication possible hopping sequence corresponding to the reference hopping sequence; and
   performing, by the device, the first D2D communication based on the final hopping sequence,
   wherein if the device does not perform a second D2D communication based on a second link with a different device before the first D2D communication, the device is the initial access device,
   wherein if the device has performed the second D2D communication based on the second link with the different device before the first D2D communication, the device is the multi-access device, and
   wherein the communication possible hopping sequence includes a plurality of candidate hopping sequences having an overlapped channel in a same slot as the reference hopping sequence.

2. The method of claim 1, wherein if the device is the initial access device or the multi-access device and if the current hopping sequence of the device is the same as the reference hopping sequence and the communication possible hopping sequence, the final hopping sequence is the same as the current hopping sequence.

3. The method of claim 1, wherein if the device is the initial access device and if the current hopping sequence of the device is not the same as the reference sequence and the communication possible hopping sequence, the final hopping sequence is the same as one of the reference hopping sequence and the communication possible hopping sequence.

4. The method of claim 1, wherein if the device is the multi-access device and if the current hopping sequence of the device is not the same as the reference sequence and the communication possible hopping sequence, the final hopping sequence is the same as the reference hopping sequence.

5. The method of claim 4, wherein the current hopping sequence, the reference hopping sequence, and the plurality of candidate hopping sequences included in the communication possible hopping sequence are one of a plurality of hopping sequences disclosed in Table 1:

TABLE 1

| Sequence ID | Hopping Sequence |
| --- | --- |
| 1 | (1, 2, 3) |
| 2 | (1, 3, 2) |
| 3 | (2, 1, 3) |
| 4 | (2, 3, 1) |
| 5 | (3, 1, 2) |
| 6 | (3, 2, 1) |

TABLE 2

| Sequence ID | Hopping Sequence | Communication Possible Hopping Sequence (CP-Sequence) |
|---|---|---|
| 1 | (1, 2, 3) | 2 (Ch. 1, Slot 1) |
|   |   | 3 (Ch. 3, Slot 3) |
|   |   | 6 (Ch. 2, Slot 2) |
| 2 | (1, 3, 2) | 1 (Ch. 1, Slot 1) |
|   |   | 4 (Ch. 3, Slot 2) |
|   |   | 5 (Ch. 2, Slot 3) |
| 3 | (2, 1, 3) | 1 (Ch. 3, Slot 3) |
|   |   | 4 (Ch. 2, Slot 1) |
|   |   | 5 (Ch. 1, Slot 2) |
| 4 | (2, 3, 1) | 2 (Ch. 3, Slot 2) |
|   |   | 3 (Ch. 1, Slot 1) |
|   |   | 6 (Ch. 2, Slot 3) |
| 5 | (3, 1, 2) | 2 (Ch. 2, Slot 3) |
|   |   | 3 (Ch. 1, Slot 2) |
|   |   | 6 (Ch. 3, Slot 1) |
| 6 | (3, 2, 1) | 1 (Ch. 2, Slot 2) |
|   |   | 4 (Ch. 1, Slot 3) |
|   |   | 5 (Ch. 3, Slot 1) | and wherein the reference hopping sequence and the communication possible hopping sequence have a mapping relation of Table 2 above.

6. A device for performing device-to-device (D2D) communication on the basis of a hopping sequence, the device comprising:
a transceiver configured to transmit or receive a radio signal; and
a processor operatively coupled to the transceiver,
wherein the processor is configured to:
obtain information on a reference hopping sequence by a device, wherein the reference hopping sequence is a current hopping sequence of a target device on which a first D2D communication is to be performed based on a first link with the device,
determine a final hopping sequence for performing the first D2D communication based on whether the device is an initial access device or a multi-access device and whether the current hopping sequence of the device is the same as at least one of the reference hopping sequence and a communication possible hopping sequence corresponding to the reference hopping sequence, and
perform the first D2D communication based on the final hopping sequence,
wherein if the device does not perform a second D2D communication based on a second link with a different device before the first D2D communication, the device is the initial access device,
wherein if the device has performed the second D2D communication based on the second link with the different device before the first D2D communication, the device is the multi-access device, and
wherein the communication possible hopping sequence includes a plurality of candidate hopping sequences having an overlapped channel in a same slot as the reference hopping sequence.

7. The device of claim 6, wherein if the device is the initial access device or the multi-access device and if the current hopping sequence of the device is the same as the reference hopping sequence and the communication possible hopping sequence, the final hopping sequence is the same as the current hopping sequence.

8. The device of claim 6, wherein if the device is the initial access device and if the current hopping sequence of the device is not the same as the reference sequence and the communication possible hopping sequence, the final hopping sequence is the same as one of the reference hopping sequence and the communication possible hopping sequence.

9. The device of claim 6, wherein if the device is the multi-access device and if the current hopping sequence of the device is not the same as the reference sequence and the communication possible hopping sequence, the final hopping sequence is the same as the reference hopping sequence.

10. The device of claim 6, wherein the current hopping sequence, the reference hopping sequence, and the plurality of candidate hopping sequences included in the communication possible hopping sequence are one of a plurality of hopping sequences disclosed in Table 1:

TABLE 1

| Sequence ID | Hopping Sequence |
|---|---|
| 1 | (1, 2, 3) |
| 2 | (1, 3, 2) |
| 3 | (2, 1, 3) |
| 4 | (2, 3, 1) |
| 5 | (3, 1, 2) |
| 6 | (3, 2, 1) |

TABLE 2

| Sequence ID | Hopping Sequence | Communication Possible Hopping Sequence (CP-Sequence) |
|---|---|---|
| 1 | (1, 2, 3) | 2 (Ch. 1, Slot 1) |
|   |   | 3 (Ch. 3, Slot 3) |
|   |   | 6 (Ch. 2, Slot 2) |
| 2 | (1, 3, 2) | 1 (Ch. 1, Slot 1) |
|   |   | 4 (Ch. 3, Slot 2) |
|   |   | 5 (Ch. 2, Slot 3) |
| 3 | (2, 1, 3) | 1 (Ch. 3, Slot 3) |
|   |   | 4 (Ch. 2, Slot 1) |
|   |   | 5 (Ch. 1, Slot 2) |
| 4 | (2, 3, 1) | 2 (Ch. 3, Slot 2) |
|   |   | 3 (Ch. 1, Slot 1) |
|   |   | 6 (Ch. 2, Slot 3) |
| 5 | (3, 1, 2) | 2 (Ch. 2, Slot 3) |
|   |   | 3 (Ch. 1, Slot 2) |
|   |   | 6 (Ch. 3, Slot 1) |
| 6 | (3, 2, 1) | 1 (Ch. 2, Slot 2) |
|   |   | 4 (Ch. 1, Slot 3) |
|   |   | 5 (Ch. 3, Slot 1) | and wherein the reference hopping sequence and the communication possible hopping sequence have a mapping relation of Table 2 above.

* * * * *